United States Patent
Jarocha

[19]

[11] Patent Number: 5,864,295
[45] Date of Patent: Jan. 26, 1999

[54] APPARATUS FOR SENSING OCCUPANT WEIGHT IN AN ACTUATABLE RESTRAINT SYSTEM

[75] Inventor: William M. Jarocha, South Lyon, Mich.

[73] Assignee: TRW Inc., Lyndhurst, Ohio

[21] Appl. No.: 619,995

[22] Filed: Mar. 21, 1996

[51] Int. Cl.⁶ .................................................. G08B 21/00
[52] U.S. Cl. ...................... 340/667; 180/273; 177/210 R; 200/85 A; 280/728.1
[58] Field of Search ............................... 340/667; 280/728, 280/730, 731, 732; 180/273; 177/210 FP, 210 R; 200/85 A, 85 R

[56] References Cited

U.S. PATENT DOCUMENTS

| | | | |
|---|---|---|---|
| 3,672,699 | 6/1972 | De Windt | 280/735 |
| 3,746,844 | 7/1973 | Azum et al. | 364/463 |
| 4,110,732 | 8/1978 | Jarocha et al. | 340/448 |
| 4,405,025 | 9/1983 | Yanagita et al. | 177/210 FP |
| 4,717,874 | 1/1988 | Ichikawa et al. | 324/207.16 |
| 4,857,824 | 8/1989 | Tew | 323/347 |
| 4,898,254 | 2/1990 | Fukui | 177/210 C |
| 4,906,924 | 3/1990 | Zannis | 324/207.18 |
| 4,916,391 | 4/1990 | Doerman et al. | 324/207.18 |
| 5,172,790 | 12/1992 | Ishikawa et al. | 180/268 |
| 5,232,243 | 8/1993 | Blackburn et al. | 280/732 |
| 5,573,269 | 11/1996 | Gentry et al. | 280/735 |

FOREIGN PATENT DOCUMENTS

| | | |
|---|---|---|
| 473324A1 | 4/1992 | European Pat. Off. . |
| 689967A | 3/1996 | European Pat. Off. . |
| 442841 | 8/1995 | Germany . |
| 195642 | 6/1989 | Japan . |
| 222525 | 1/1990 | Japan . |

Primary Examiner—Jeffrey A. Hofsass
Assistant Examiner—Daryl C. Pope
Attorney, Agent, or Firm—Tarolli, Sundheim, Covell, Tummino & Szabo

[57] ABSTRACT

An apparatus (10) for sensing weight of an occupant on a vehicle seat (36) in an occupant restraint system (10) includes variable inductance sensor (50) mounted in the seat (36) so that inductance of the sensor (50) is functionally related to the occupant's weight on the seat (36). A capacitor (98) is connected in parallel across the variable inductance sensor (50). The capacitor (98) and the variable inductance sensor (50) form a tank circuit (100). An oscillator (40) is operatively coupled to the tank circuit (100) for driving the tank circuit (100) into oscillation. A phase detector (94) monitors a phase shift between an output of said oscillator and oscillation of tank circuit. Weight on the seat is functionally related to the monitored phase shift.

16 Claims, 5 Drawing Sheets

APPARATUS FOR SENSING OCCUPANT WEIGHT IN AN ACTUATABLE RESTRAINT SYSTEM

TECHNICAL FIELD

The present invention is directed to an occupant restraint system in a vehicle and specifically to an apparatus for sensing occupant weight in an actuatable restraint system.

BACKGROUND OF THE INVENTION

Systems for restraining vehicle occupants during front impacts are known in the art. U.S. Pat. No. 5,232,243 to Blackburn et al., assigned to TRW Vehicle Safety Systems Inc., discloses such a system. The '243 patent further discloses control of the actuatable occupant restraint system in response to sensed occupant position and weight.

SUMMARY OF THE INVENTION

In accordance with the present invention, an apparatus is provided for sensing weight on a vehicle seat. The apparatus comprises variable inductance sensor means mounted in the seat for providing an inductance value functionally related to the weight on the seat. An oscillator means drives the variable inductance sensor means into oscillation. The apparatus further includes means for monitoring a phase shift between an output of the oscillator means and oscillation of the variable inductance sensor means. Weight on the seat is functionally related to the monitored phase shift.

In accordance with another embodiment of the present invention, an apparatus for sensing weight of an occupant on a vehicle seat in an occupant restraint system comprises variable inductance sensor means mounted in the seat for providing a variable inductance value functionally related to the occupant's weight on the seat. A capacitor is connected in parallel across the variable inductance sensor means. The capacitor and the variable inductance sensor means forms a tank circuit. Oscillator means is operatively coupled to the tank circuit for driving the tank circuit into oscillation. Means are provided for monitoring a phase shift between an output of the oscillator means and oscillation of the tank circuit. Weight on the seat is functionally related to the monitored phase shift.

BRIEF DESCRIPTION OF THE DRAWING

Further features and advantages of the present invention will become apparent to those skilled in the art to which the present invention relates from reading the following detailed description with reference to the accompanying drawings, in which.

DETAILED DESCRIPTION

Figure 1:
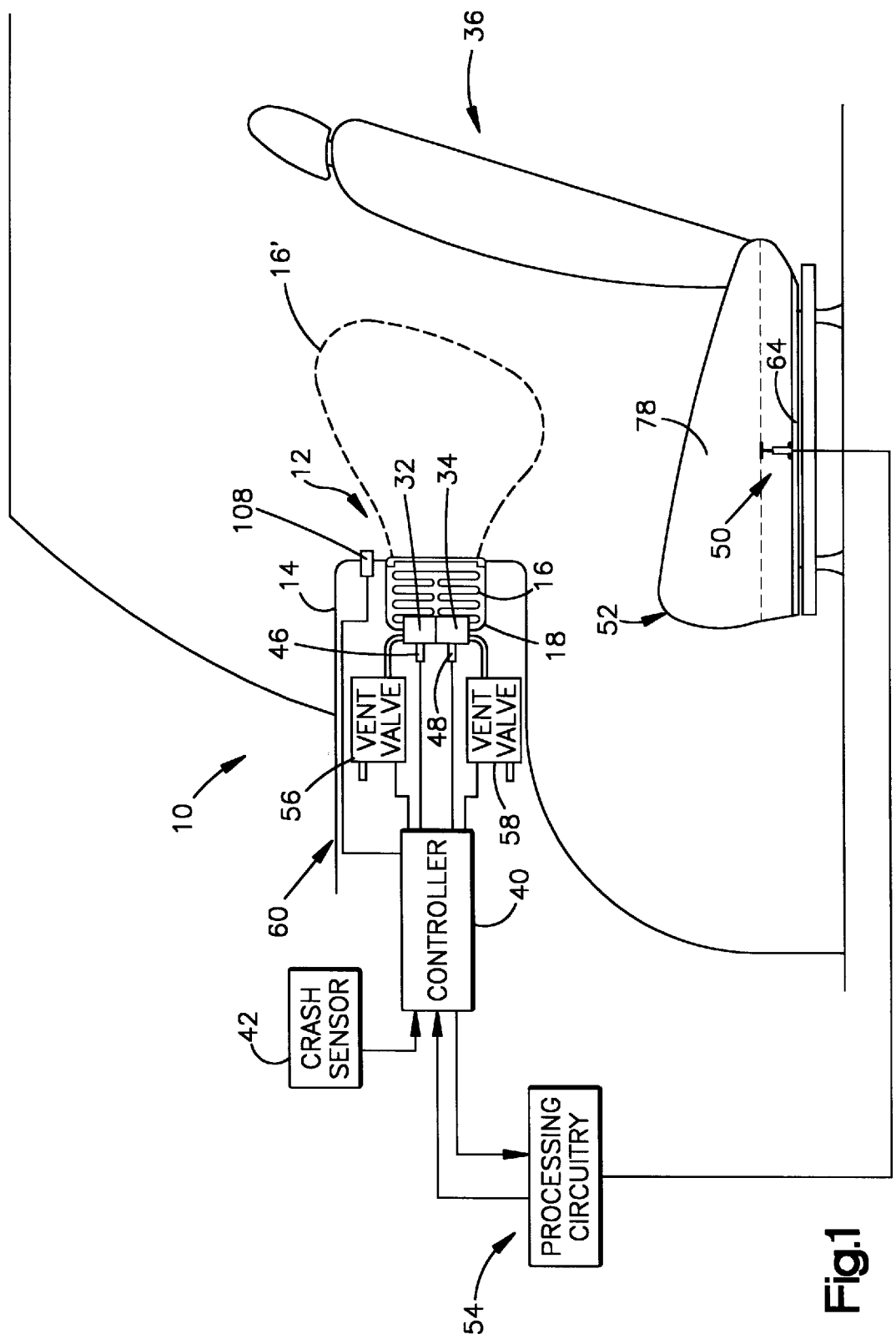
FIG. 1 is a schematic of an occupant restraint system including a weight sensor in accordance with the present invention.

Referring to FIG. 1, an actuatable occupant restraint system 10 includes an air bag assembly 12 mounted in an opening of a dashboard 14 of a vehicle. The air bag assembly 12 includes an air bag 16 folded within the interior of an air bag housing 18. A cover 20 covers the air bag 16 and is adapted to open easily upon inflation of the air bag 16.

Sources 32, 34 of inert gas are mounted at the back of the housing 18 and are operatively connected to the air bag 16. Gas discharged from the sources 32, 34, which may be generated by combustion of pyrotechnic material and/or released from a pressurized container, fills the air bag 16 to its inflated condition 16'.

An electronic controller 40, such as a microcomputer, is operatively connected to a vehicle crash sensor 42. The crash sensor 42 may be any of several known types. For example, the crash sensor 42 may be a mechanical inertia switch, such as a rolamite sensor, or an electrical accelerometer. If an inertia switch is used having normally open inertia switch contacts and the switch contacts close, this is an indication that a crash is occurring. Likewise, if a signal from an electronic accelerometer reaches a predetermined level or a predetermined level for a predetermined time, this is an indication that a crash is occurring. There are several crash algorithms known in the art for discriminating between deployment and non-deployment crash conditions. Once the controller 40 determines that a vehicle crash is occurring for which deployment of the air bag is necessary to hopefully enhance protection of the vehicle occupant, the controller 40 ignites one or both of the squibs 46, 48 which, in turn, actuate the gas sources 32, 34, respectively.

The occupant seat 36 includes an occupant weight sensor 50 mounted to the bottom frame of the seat and is operatively biased against the bottom cushion 52 of the seat 36. The occupant weight sensor 50 is electrically coupled with the controller 40 through processing circuitry 54. Sensor 50 provides an electrical signal indicative of the weight of the occupant setting on seat 36.

A vent valve 56 is operatively connected to the gas source 32. Similarly, a vent valve 58 is operatively connected to the gas source 34. The controller 40 is controllably connected to the vent values 56, 58. The vent valves 56, 58 are use to control the inflation of the air bag 16. If the vent valves 56, 58 are fully closed upon actuation of the gas sources 32, 34, the air bag 16 inflates to its maximum volume, at maximum pressure, and at a maximum inflation rate. By controlling whether one or both gas sources 32, 34 are actuated and by controlling the vent valves 56, 58, the inflation rate and pressure of the air bag 16 are controlled to values less than the maximum values.

Controller 40 controls the gas sources 32, 34 and vent valves 56, 58 during a deployment crash condition in response to the weight of the occupant as sensed by the weight sensor 50. Of course, control of the gas sources and vent valves may also be responsive to the crash intensity. U.S. Pat. No. 5,232,243 to Blackburn et al., which is hereby fully incorporated herein by reference, discloses such control strategy for controlling gas sources 32, 34 and vent valves 56, 58 in response to sensed occupant weight. The squibs 46, 48 and vent valves 56, 58 are collectively referred to herein as air bag controls 60.

Figure 2:
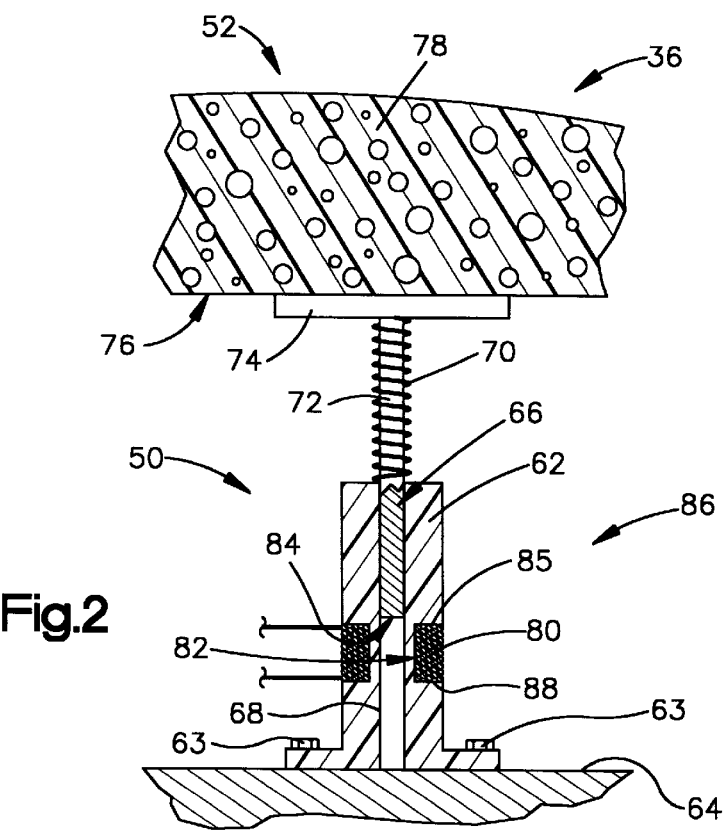
FIG. 2 is a schematic side view of the weight sensor shown in FIG. 1.

Referring to FIG. 2, the weight sensor 50 includes a coil form 62, preferably made from plastic. The coil form is secured with bolts 63 to a stationary mounting member 64 located at the bottom of the seat 36. A T-shaped metal plunger 66 is slidably received in a bore 68 of the plastic coil form 62. A spring 70 surrounds leg 72 of the plunger 66 and is operative between the coil form 62 and a leg 74 of the plunger 66. The spring 70 biases the leg 74 of plunger 66 against the bottom surface 76 of the foam cushion portion 78 of the bottom seat portion 52. The spring 70 maintains the plunger in contact with the seat bottom surface 76 but does not provide seat support. Those skilled in the art will appreciate that the seat 36 has internal support springs, not shown.

A wire coil 80 is wrapped around a recess portion 82 of the coil form 62. The dimensions of the coil form 62, plunger 66, and location and length of coil 80 are so selected so that, when no weight is on the occupant seat 36, the bottom end 84 of the plunger 66 is just aligned with the end 85 of the coil 80. The plunger 66 and coil 80 form a variable inductor 86. As weight is applied to the seat 36, the plunger 66 further progresses into the coil 80. The length of the coil 80 relative to the bore 68 is sufficient to ensure that a person of a predetermined maximum weight will result in the end 84 of the plunger 66 aligning with the end 88 of the coil 80.

Figure 3:
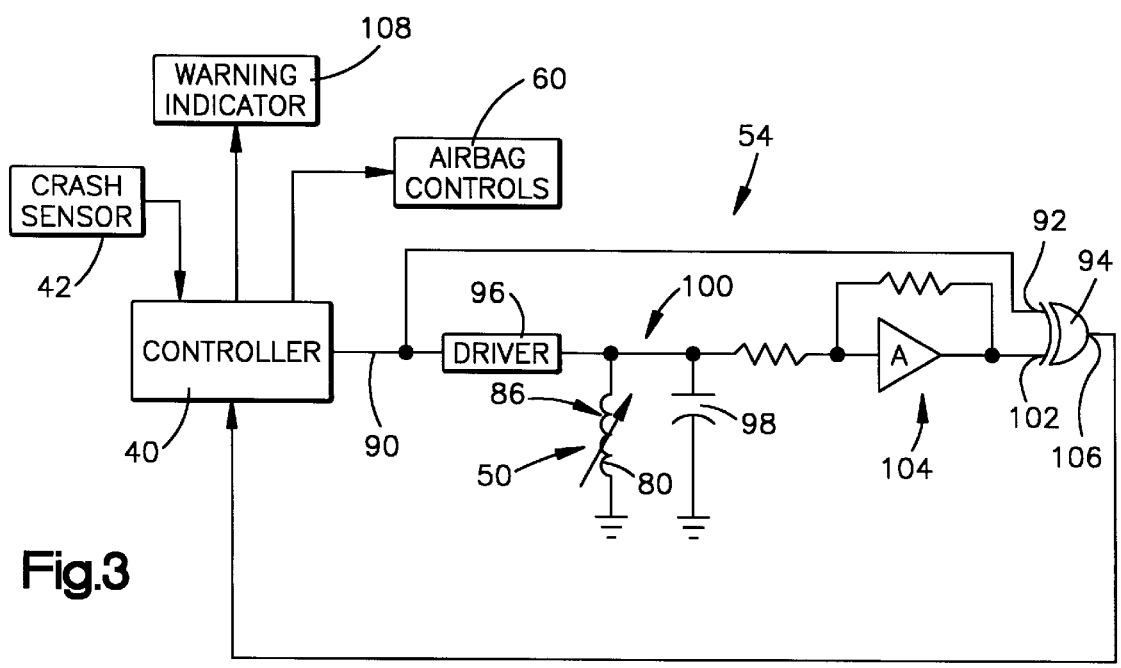
FIG. 3 is a schematic of the drive and processing circuitry shown in FIG. 1.

Referring to FIG. 3, the controller 40 outputs a square wave signal to a first input 92 of an EXCLUSIVE-OR gate 94 and to a driver circuit 96. The coil 80 has one terminal connected to electrical ground. The other terminal of coil 80 is connected to the output of the driver circuit 96. A capacitor 98 is electrically connected in parallel across the coil 80. The coil 80 and plunger 66 combination form a variable inductor 86. The inductor 86 and capacitor 98 form a tank circuit 100. The output of the tank circuit 100 is coupled to a second input 102 of the EXCLUSIVE-OR gate 94 through an amplifier circuit 104. The output 106 of the EXCLUSIVE-OR gate 94 is connected to the controller 40. The driver circuit 96, capacitor 98, amplifier 104, and the EXCLUSIVE-OR gate 94 comprise the processing circuitry 54.

The value of the capacitor 98 and the frequency of the signal 90 output from the controller 40 are selected so that the resonant frequency of the tank circuit 100 is matched to the frequency of the signal 90 when the plunger is in an operative location, i.e., adjacent to or in the coil 80. Those skilled in the art will appreciate that the EXCLUSIVE-OR gate 94 functions as a phase detector. The EXCLUSIVE-OR gate 94 will output a pulse-width-modulated ("PWM") signal having a value functionally related to the monitored phase difference between the oscillator signal 90 and the oscillation of the tank circuit 100. When the plunger is not displaced into the coil, i.e., no weight is on the seat 36, a predetermined minimum phase shift occurs between the oscillation signal 90 and the output of amplifier 104 resulting in a minimum duty cycle. When the plunger bottom 84 aligns with the end 88 of the coil 80, i.e., the plunger is fully received into the coil, the duty cycle will be a maximum value. Therefore, the weight on the seat is measured as a function of the value of the duty cycle of the output of the EXCLUSIVE-OR gate 94. Preferably, the controller includes a look-up table for correlating displacement with weight. Occupant weight can be categorized in weight ranges.

As an alternative to have a PWM signal fed back to the controller 40, the output of the EXCLUSIVE-OR gate 94 could be further processed to convert the PWM signal into a DC voltage value. The output of the converter would then be connected to the controller 40. In this manner, the weight on the occupant seat 36 would be measured as a function of the value of the DC signal output from the converter.

The controller 40 monitors the weight on the occupant seat 36. When the air bag is deployed, the air bag is controlled through use of the air bag controls 60 as described in the above-incorporated '243 patent. If the controller 40 determines that no PWM signal is being received from the output of the EXCLUSIVE-OR gate 94, such a condition is indicative of a fault such as a broken wire. If the controller 40 determines a fault condition exists, it activates a warning indicator 108.

Figure 4:
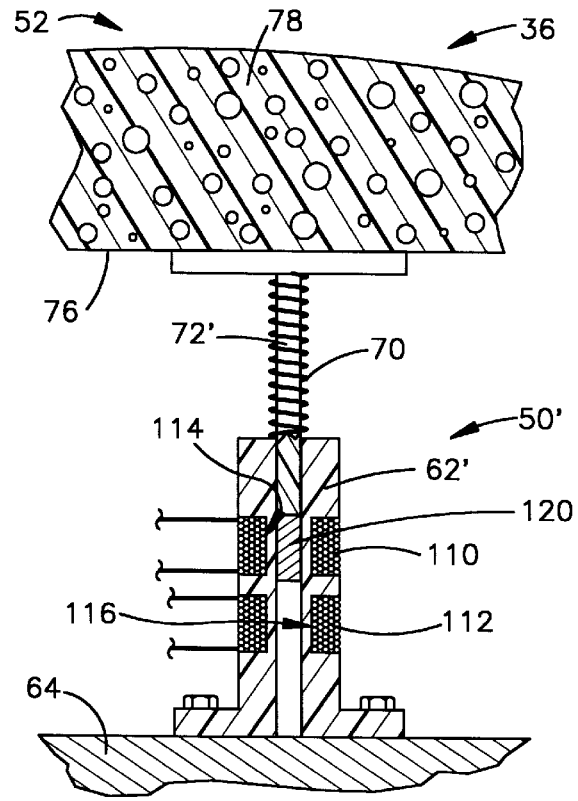
FIG. 4 is a schematic side view of a weight sensor in accordance with another embodiment of the present invention.

Referring to FIG. 4, another embodiment of the present invention includes a weight sensor 50' having a plastic coil form 62' secured to the mounting plate 64 in a manner as described above. In accordance with this embodiment, the coil form includes two separated coils 110, 112 wrapped at associated recess portions 114, 116 of the coil form 62'. The plunger 72' is made mainly of plastic with a ferrite tip portion 120, i.e., made from a ferromagnetic material. The plunger 72' is spring biased against the bottom 76 of the foam portion 78 of the seat bottom 52 just as described above with regard to the FIG. 2 embodiment.

In accordance with the embodiment shown in FIG. 4, the plunger 72' and coil form 62' are so dimensioned so that when no weight is on the occupant seat, the ferrite tip 120 is fully received in and aligned with coil 110. As weight is placed on the seat causing the plunger to traverse or extend into the coil form 62', the tip 120 exits coil 110 and is received in coil 112. This arrangement forms two variable inductors, one with increasing inductance and one with decreasing inductance.

Figure 5:
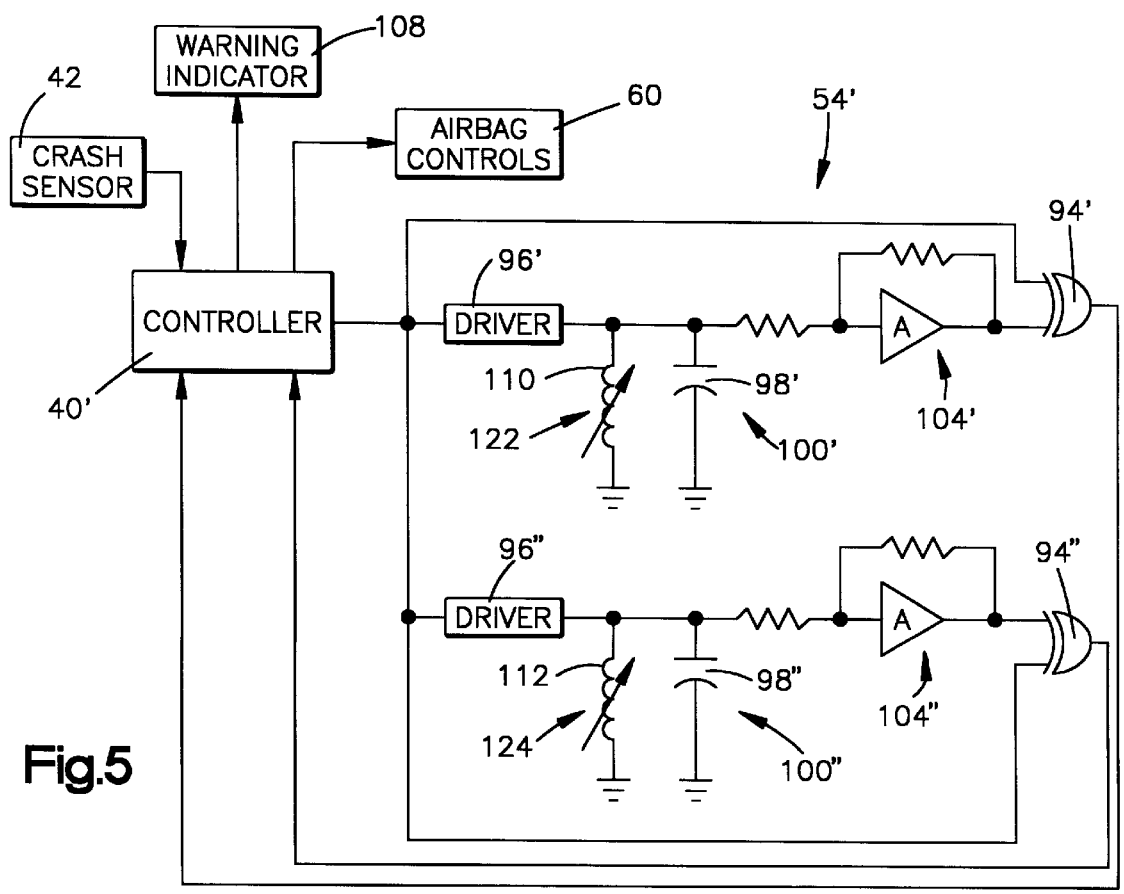
FIG. 5 is a schematic of the drive and processing circuitry for the weight sensor of FIG. 4.

Referring to FIG. 5, the control circuit for use with the weight sensor shown in FIG. 4 will be appreciated. A square wave oscillator output of a controller 40' is connected to one input of a first EXCLUSIVE-OR gate 94' and to the first input of a second EXCLUSIVE-OR gate 94". The oscillator output of the controller 40' is further connected to a first drive circuit 96' and to a second drive circuit 96".

The output of drive circuit 96' is connected to a tank circuit 100'. The tank circuit 100' includes coil 110 and associated parallel connected capacitor 98'. The coil 110 and plunger 72' form a first variable inductor 122. The output of tank circuit 100' is coupled to the second input of EXCLUSIVE-OR gate 94' through an amplifier circuit 104'.

The output of drive circuit 96" is connected to a tank circuit 100". The tank circuit 100" includes coil 112 and associated parallel connected capacitor 98". The coil 112 and plunger 72' form a second variable inductor 124. The output of tank circuit 100" is coupled to the second input of EXCLUSIVE-OR gate 94" through an amplifier circuit 104".

The outputs of the EXCLUSIVE-OR gates 94' and 94" are connected to the controller 40'. The value of the capacitors 98' and 98" and the frequency of the signal output from the controller 40' are selected so that the resonant frequency of the tank circuits 100' and 100" match the output of the oscillator output from the controller 40' when the tip is in or near coils 110, 112. Those skilled in the art will appreciate that the EXCLUSIVE-OR gates 94' and 94" function as a phase detectors in a similar manner as described above. When no weight is on the occupant seat, the duty cycle of the EXCLUSIVE-OR gate 94' is at a maximum value and the duty cycle of the EXCLUSIVE-OR gate 94" is at a minimum value. When weight is place on the seat causing the plunger to extend into the coil form, the duty cycle of the EXCLUSIVE-OR gate 94' begins to decrease toward a minimum value and the duty cycle of the EXCLUSIVE-OR gate 94" begins to increase toward a maximum value.

The controller 40' determines occupant weight in response to the duty cycle of the signals from the gates 94', 94". In response to the determined weight, the controller 40' controls the air bag controls 60 in a manner as described in the above-incorporated '243 patent. Also, if either of the signals from gates 94' or 94" do not output a PWM signal, such a condition is indicative of a fault condition such as a broken wire. When the controller 40' determines that one coil circuit is in a fault condition, the controller 40' flashes the warning indicator 108 to indicate a problem in the system. The air bag can still be controlled in response to the signal received from the working coil circuit. If both gates 94', 94" fail to produce a PWM signal, the controller 40' continuously actuates the warning indicator 108 instead of periodically energizing it.

Figure 6:
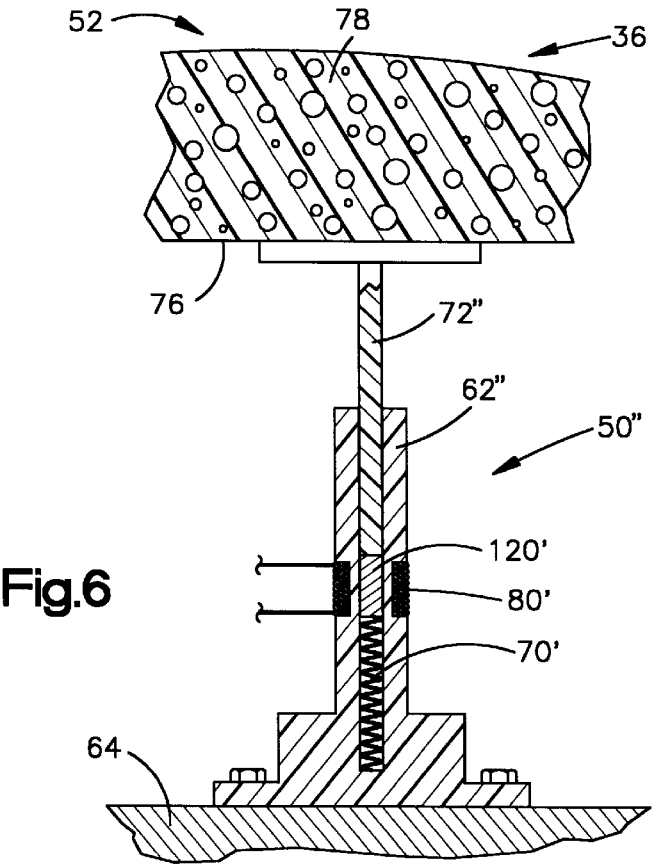
FIG. 6 is a schematic side view of a weight sensor in accordance with yet another embodiment of the present invention.

Referring to FIG. 6, another embodiment of the present invention is shown. This embodiment of the weight sensor 50" is similar to the that shown in FIG. 2 except that the spring 70' is located in the bore of the coil form 62". Plunger 72" is preferably made of plastic with a ferromagnetic tip portion 120'. The dimensions of the coil form 62" and the plunger 72" are such that when no weight is on the seat 36, the tip portion 120' is fully received in and aligned with coil 80'. This keeps spring 70' out of the coil 80'. With this arrangement, the duty cycle from the circuit shown in FIG. 3 would shift from a maximum duty cycle when no weight was on the seat, to a decreasing duty cycle when weight is applied to the seat and the tip portion 120' exists the coil 80'.

Figure 7:
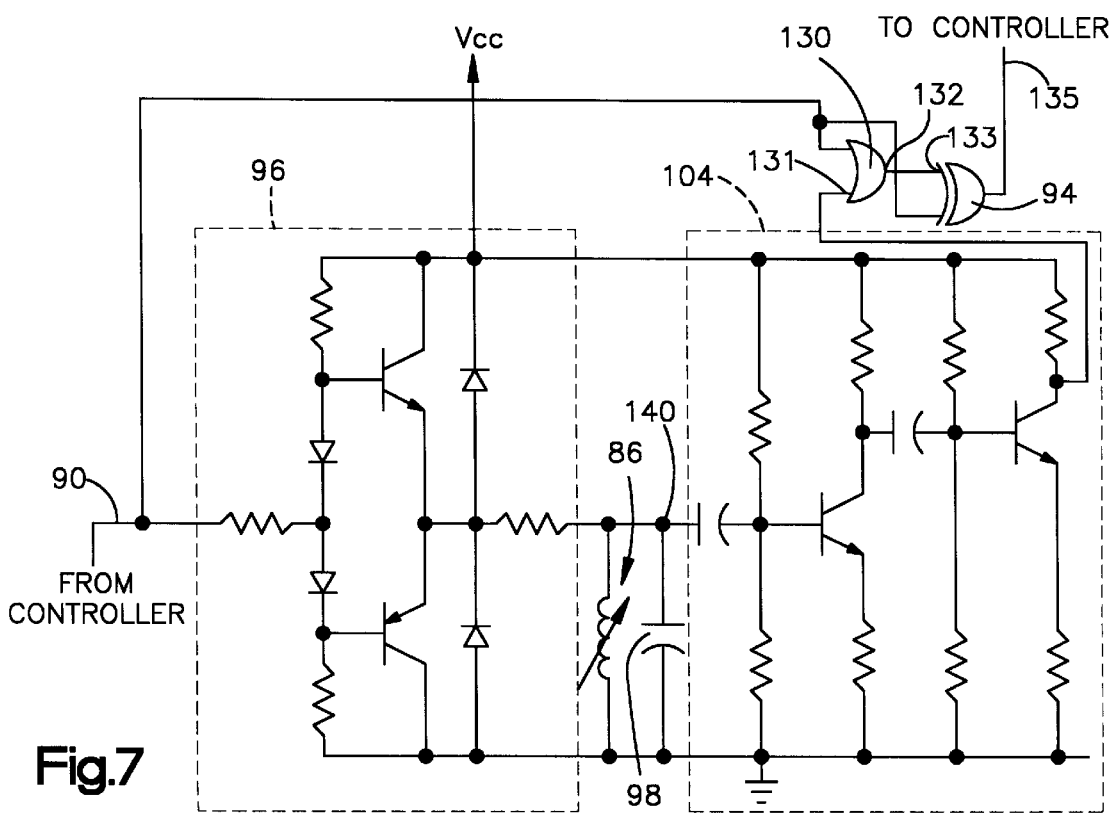
FIG. 7 is a schematic diagram showing processing circuitry for use with the present invention.

Referring to FIG. 7, details of a drive circuit 96 and amplifier circuit 104 are shown. The drive circuit 96 includes a push-pull amplifier with a set of diodes to provide thermal stability. The amplifier 104 includes a two stage transistor amplifier that provides a fast response and temperature stability. The circuit shown in FIG. 7 includes the addition of an OR gate 130 prior to the phase detecting EXCLUSIVE-OR gate 94. The output of the amplifier is connected to an input 131 of OR gate 130. The output 132 of OR gate 130 is connected to an input 133 of EXCLUSIVE-OR gate 94. The output 135 of EXCLUSIVE-OR gate 94 is connected back to the controller 40. The OR gate 130 gives the system an improved ability to detect the phase shifted signal. This is due to the switching thresholds and amplitude changes that occur at the output of the tank circuit 100.

Figure 8:
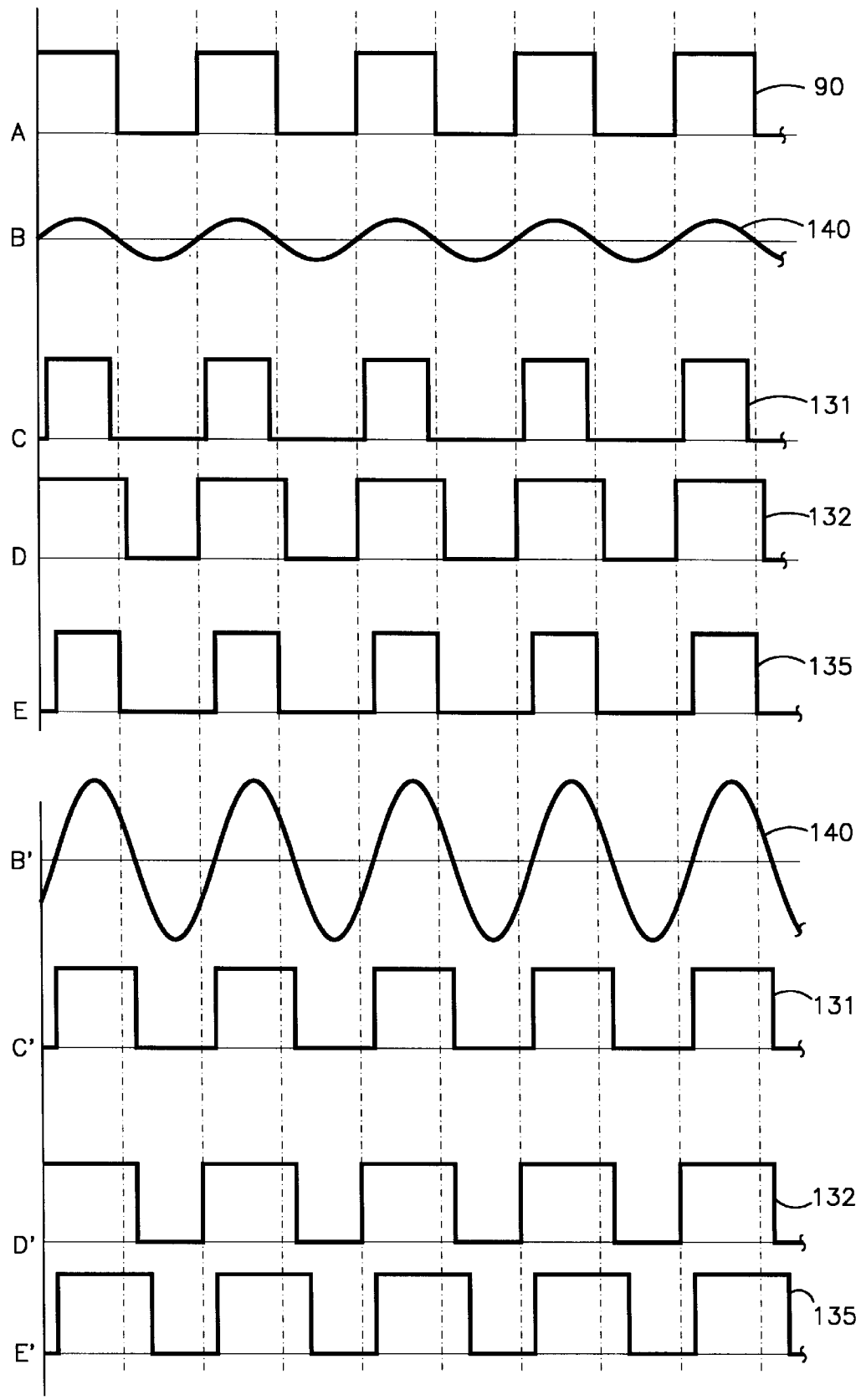
FIG. 8 is a graph depicting signal values at various circuit locations for the circuit shown in FIG. 7.

Referring to FIG. 8, a time graph is shown for various signals present in the embodiment shown in FIG. 7. Time line A is the oscillator output 90. Time line B shows the voltage 140 at the tank circuit when the plunger 70 is positioned to result in a minimal phase shift. Time line C is the signal present on input 131 of OR gate 130. Time line D is the output 132 of OR gate 130. Time line E is the output 135 of EXCLUSIVE-OR gate 94. The time line B' represents the signal 140 at the tank circuit when the plunger 70 is moved to a position that results in a larger phase shift than shown in time line B. Note that there is also an amplitude increase. Time lines C', D', and E' correspond to the signals 131, 132, 135, respectively, for the phase shift depicted by the tank oscillation B'.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for sensing weight on a vehicle seat, said apparatus comprising:
    variable inductance sensor means mounted in said seat for providing a variable inductance value functionally related to the weight on said seat;
    oscillator means for driving said variable inductance sensor means into oscillation; and
    means for monitoring a phase shift between an output of said oscillator means and oscillation of said variable inductance sensor means, weight on said seat being functionally related to said monitored phase shift.

2. The apparatus of claim 1 wherein said variable inductance sensor means includes a coil form having a single coil wound thereon and a plunger having at least a portion thereof made from a ferromagnetic material, said plunger being slidably received in said coil form so that said inductance of said coil varies in response to the position of said plunger, said plunger being mounted so as to vary its position relative to said coil in response to weight on said seat.

3. The apparatus of claim 1 wherein said means for monitoring a phase shift is includes an EXCLUSIVE-OR gate.

4. The apparatus of claim 1 wherein said means for monitoring a phase shift includes means for providing a pulse-width-modulated signal in response to said monitored phase shift.

5. The apparatus of claim 4 wherein said means for monitoring includes means to shift said pulse-width-modulated signal from a minimum value to a maximum value in response to increased weight on said seat.

6. The apparatus of claim 4 wherein said means for monitoring includes means to shift said pulse-width-modulated signal from a maximum value to a minimum value in response to increased weight on said seat.

7. The apparatus of claim 1 wherein said variable inductance sensor means includes a coil form having two spaced apart coils wound thereon and a plunger having at least a portion thereof made from a ferromagnetic material, said plunger being slidably received inside said coil form so that said inductance of one of said coils increases in response to the movement of said plunger and said inductance of the other of said coils decreases in response to the movement of said plunger, said plunger being mounted so as to vary its movement relative to said coils in response to weight on said seat.

8. The apparatus of claim 1 further including means for sensing an error condition and means for providing an error indication.

9. An apparatus for sensing weight of an occupant on a vehicle seat in an occupant restraint system, said apparatus comprising:
    variable inductance sensor means mounted in said seat for providing a variable inductance value functionally related to the occupant's weight on said seat;
    capacitor connected in parallel across said variable inductance sensor means, said capacitor and said variable inductance sensor means forming a tank circuit;
    oscillator means operatively coupled to said tank circuit for driving said tank circuit into oscillation; and
    means for monitoring a phase shift between an output of said oscillator means and oscillation of said tank circuit, weight on said seat being functionally related to said monitored phase shift.

10. The apparatus of claim 9 wherein said variable inductance sensor means includes a coil form having a single coil wound thereon and a plunger having at least a portion thereof made from a ferromagnetic material, said plunger being slidably received in said coil form so that said inductance of said coil varies in response to the position of said plunger, said plunger being mounted so as to vary its position relative to said coil in response to occupant weight on said seat.

11. The apparatus of claim 9 wherein said means for monitoring a phase shift is includes an EXCLUSIVE-OR gate.

12. The apparatus of claim 9 wherein said means for monitoring a phase shift includes means for providing a pulse-width-modulated signal in response to said monitored phase shift.

13. The apparatus of claim 12 wherein said means for monitoring includes means to shift said pulse-width-modulated signal from a maximum value to a minimum value in response to increased weight on said seat.

14. The apparatus of claim 9 wherein said variable inductance sensor means includes a coil form having two spaced apart coils wound thereon and a plunger having at least a portion thereof made from a ferromagnetic material, said plunger being slidably received inside said coil form so that said inductance of one of said coils increases in response to the movement of said plunger and said inductance of the other of said coils decreases in response to the movement of said plunger, said plunger being mounted so as to vary its movement relative to said coils in response to weight on said seat.

15. The apparatus of claim 9 further including means for controlling said occupant restraint in response to sensed occupant weight.

16. The apparatus of claim 9 further including means for sensing an error condition and means for providing an error indication.

* * * * *